US008683333B2

(12) United States Patent
Garbow et al.

(10) Patent No.: US 8,683,333 B2
(45) Date of Patent: *Mar. 25, 2014

(54) BROKERING OF PERSONALIZED RULESETS FOR USE IN DIGITAL MEDIA CHARACTER REPLACEMENT

(75) Inventors: Zachary Adam Garbow, Rochester, MN (US); Candace Trielle Pederson, Rochester, MN (US); Michael Anthony Nelson, Jr., Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2280 days.

This patent is subject to a terminal disclaimer.

(21) Appl. No.: 11/297,313

(22) Filed: Dec. 8, 2005

(65) Prior Publication Data

US 2007/0136745 A1    Jun. 14, 2007

(51) Int. Cl.
*G06F 3/00* (2006.01)
(52) U.S. Cl.
USPC .......................................... 715/706; 715/744
(58) Field of Classification Search
USPC ......................................................... 715/706
See application file for complete search history.

(56) References Cited

U.S. PATENT DOCUMENTS

| | | | |
|---|---|---|---|
| 5,862,223 A | 1/1999 | Walker et al. | |
| 5,884,029 A * | 3/1999 | Brush et al. | 709/202 |
| 6,243,087 B1 | 6/2001 | Davis et al. | |
| 6,283,858 B1 | 9/2001 | Hayes, Jr. et al. | |
| 6,944,628 B1 | 9/2005 | De Breed | |
| 7,208,669 B2 * | 4/2007 | Wells et al. | 84/601 |
| 2002/0051119 A1 | 5/2002 | Sherman et al. | |
| 2003/0003157 A1 | 1/2003 | Ohan et al. | |
| 2003/0108329 A1 | 6/2003 | Adriansen et al. | |
| 2003/0139938 A1 | 7/2003 | Meyers | |
| 2003/0190954 A1 * | 10/2003 | Sitrick | 463/35 |
| 2003/0218626 A1 | 11/2003 | Greene | |
| 2003/0227475 A1 | 12/2003 | Fellenstein et al. | |
| 2003/0228135 A1 | 12/2003 | Illsley | |
| 2005/0076367 A1 | 4/2005 | Johnson et al. | |
| 2006/0048184 A1 | 3/2006 | Poslinski et al. | |
| 2007/0063999 A1 * | 3/2007 | Park | 345/419 |
| 2007/0260567 A1 * | 11/2007 | Funge et al. | 706/47 |

FOREIGN PATENT DOCUMENTS

KR      1020050108243 A     11/2005

OTHER PUBLICATIONS

U.S. Patent and Trademark Office, Office Action issued in related U.S. Appl. No. 11/297,300, dated Oct. 6, 2009.

(Continued)

*Primary Examiner* — Doon Chow
*Assistant Examiner* — Le Nguyen
(74) *Attorney, Agent, or Firm* — Wood, Herron & Evans, LLP

(57) ABSTRACT

An apparatus, program product and method utilize a brokering service for use in controlling the incorporation of likeness data for an individual into a media presentation. The brokering service maintains a plurality of rulesets respectively associated with a plurality of individuals. Each ruleset is used to restrict or otherwise control the incorporation of likeness data associated with an associated individual into media presentations, typically through the inclusion of one or more rules configured to define conditions under which the likeness data for the associated individual may or may not be incorporated into a media presentation. The brokering service is capable of responding to requests for selected rulesets for different individuals by communicating the rulesets to various requesting entities.

22 Claims, 8 Drawing Sheets

(56) References Cited

OTHER PUBLICATIONS

U.S. Patent and Trademark Office, Office Action issued in related U.S. Appl. No. 11/297,300, dated Aug. 26, 2010.
U.S. Patent and Trademark Office, Final Office Action issued in related U.S. Appl. No. 11/297,300, dated Dec. 8, 2010.
U.S. Patent and Trademark Office, Examiner's Answer to Appeal Brief issued in related U.S. Appl. No. 11/297,300, dated Aug. 5, 2011.
U.S. Patent and Trademark Office, Subsequent Examiner's Answer to Appeal Brief issued in related U.S. Appl. No. 11/297,300, dated Oct. 20, 2011.

* cited by examiner

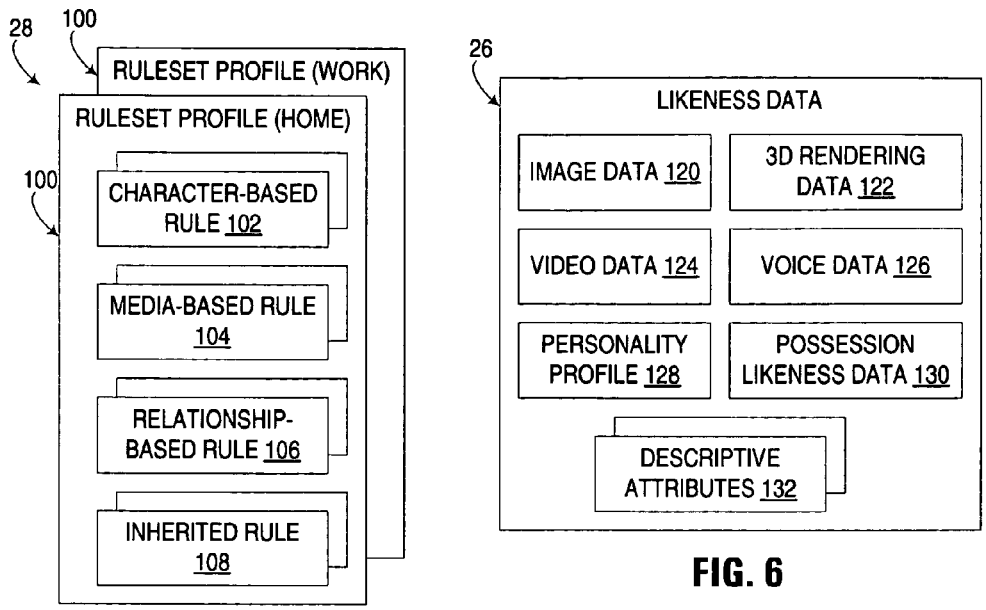
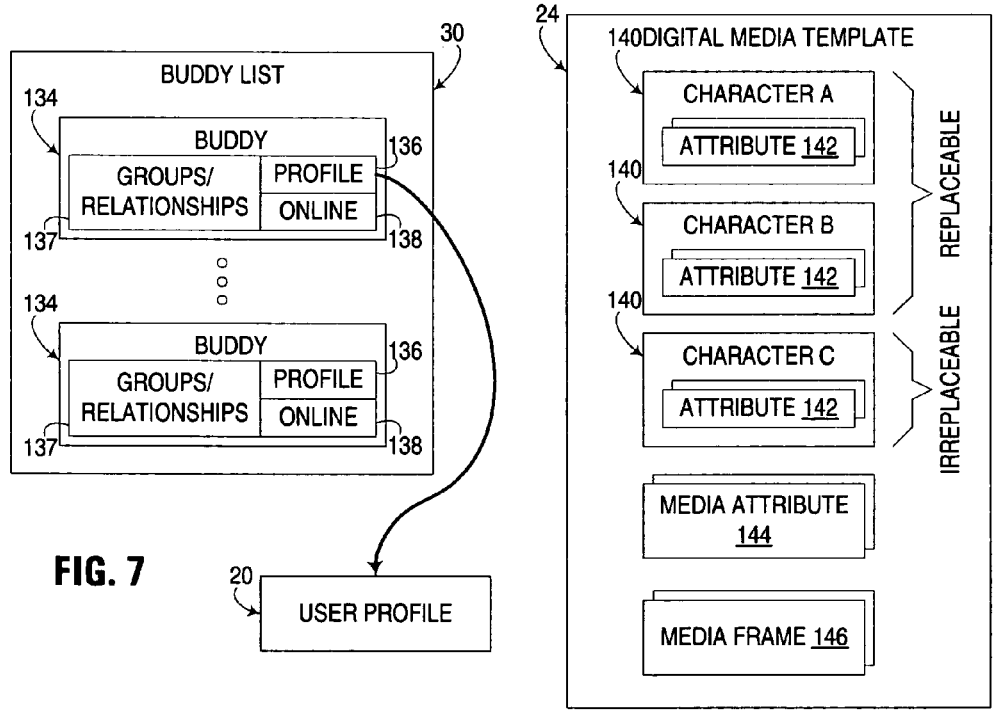

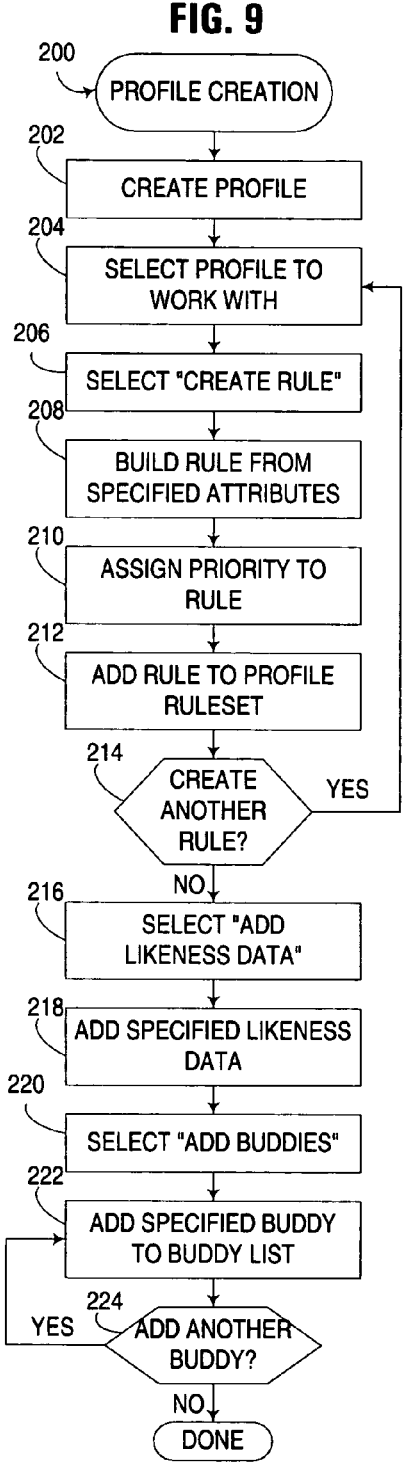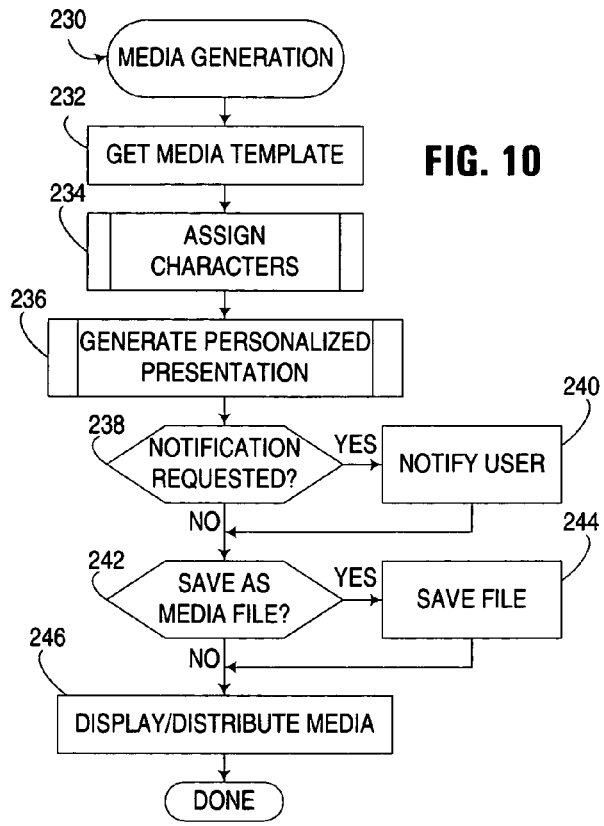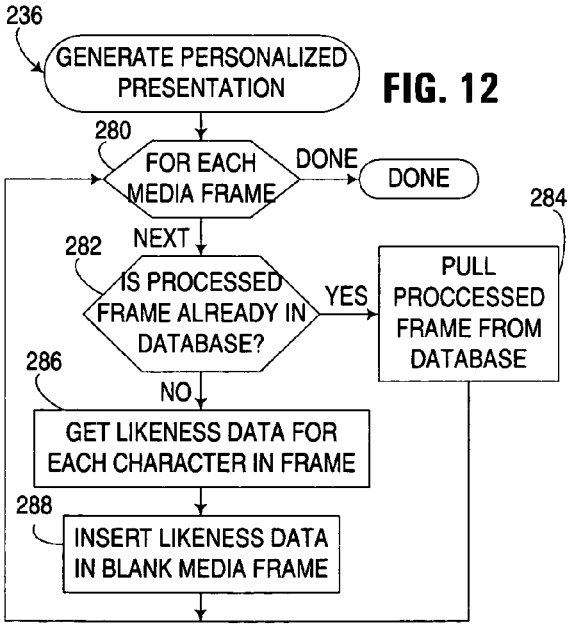

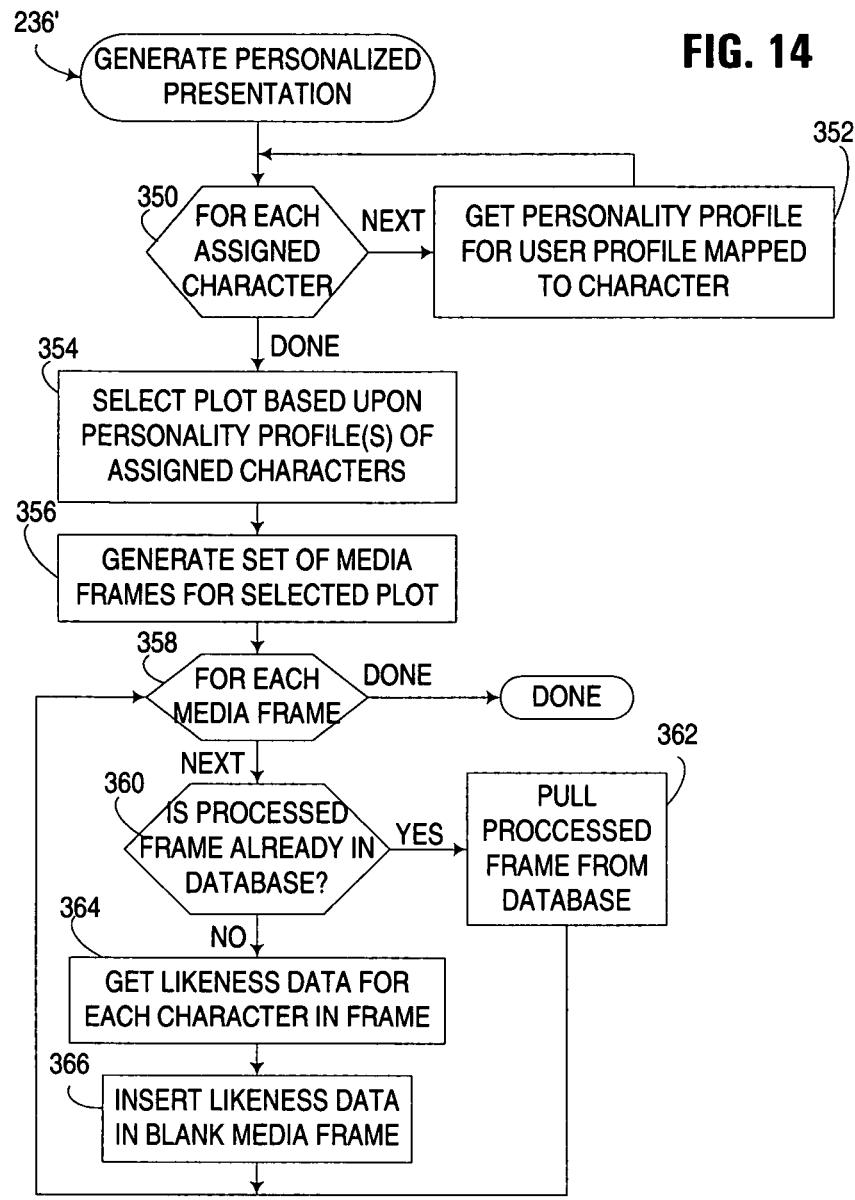

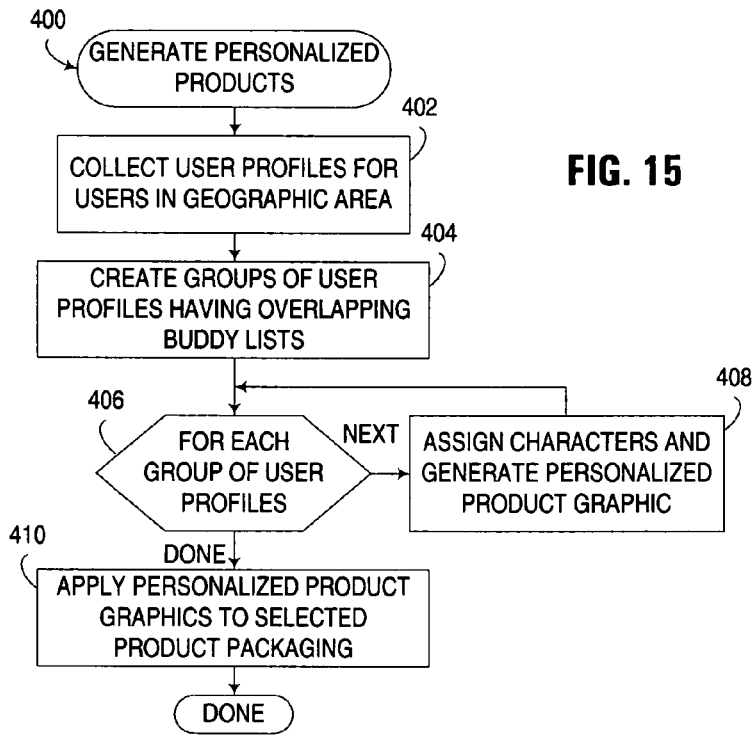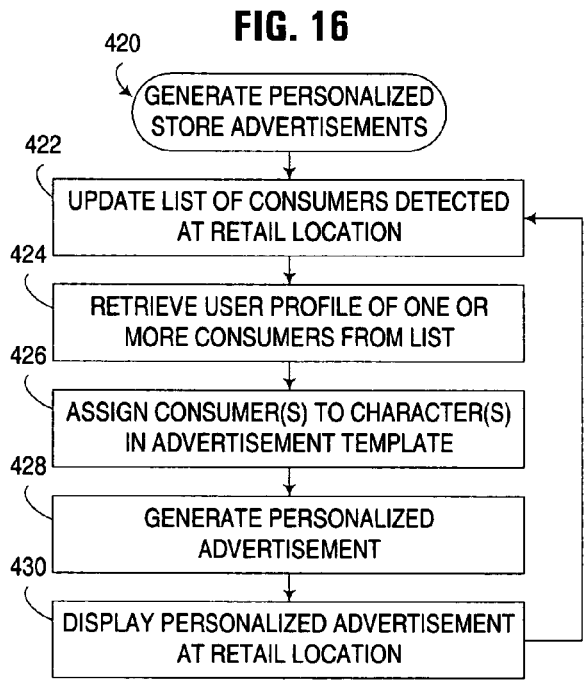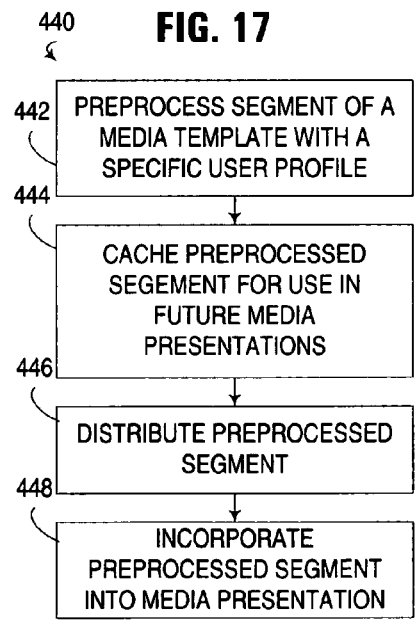

BROKERING OF PERSONALIZED RULESETS FOR USE IN DIGITAL MEDIA CHARACTER REPLACEMENT

CROSS-REFERENCE TO RELATED APPLICATIONS

This application is related to U.S. Ser. No. 11/297,300 filed on even date herewith by Zachary Adam Garbow et al. and entitled "CONTROL OF DIGITAL MEDIA CHARACTER REPLACEMENT USING PERSONALIZED RULESETS", which application is incorporated by reference herein.

FIELD OF THE INVENTION

The invention is generally directed to media presentations, and in particular, to character replacement in digital media presentations.

BACKGROUND OF THE INVENTION

With the increasing number of entertainment options and technologies available to consumers, advertisers are constantly looking to increase the efficacy of advertisements and other marketing efforts. As an example, television commercials are in danger of losing their potency and relevancy due to the widespread adoption of digital video recorders (DVR's) that provide consumers with the ability to easily skip through commercials. Furthermore, many consumers are migrating to other forms of entertainment such as the Internet. It is therefore becoming increasingly important for advertisers to find innovative and creative techniques to captivate the consumer's attention and become more closely integrated with a consumer's life.

Likewise, given the vast amount of content that is available to consumers from various entertainment media, and thus increased competition for consumer attention, content providers are also on the lookout for new techniques for providing attractive content to consumers.

An emerging technology that may revolutionize a number of types of media is personal character replacement. Character replacement allows users to replace a character within a digital media presentation with their own likeness. For example, character replacement may be used in video games to enable a user to replace the face and/or body of a character in a game with a custom person of his or her choosing, often enabling a user to turn himself or herself into the hero or protagonist of the game. In addition, character replacement may be used in movies or other scripted entertainment, allowing audience members to take the place of the onscreen characters. In a related area, many video games, particularly sports-related games, characters may be based upon real individuals, e.g., professional athletes, typically using similar techniques to those used to insert users' likenesses into a media presentation.

While character replacement can be computationally intense, and may be limited in terms of realism in many applications (particularly when required to be performed in real time), the continual improvements in computer hardware and software technologies will inevitably improve the realism of character replacement, as well as open up new applications for the technology.

One area in which character replacement could have a significant potential is in personalizing advertisements such as television commercials. It is believed that consumer attention and interest in a television commercial could be significantly increased by having the consumer become the "star" in the commercial. However, the introduction of consumers into commercials and other media content raises a number of issues in terms of consumer privacy as well as other legal and practical issues.

In particular, along with the ability to introduce a user's likeness into situations that a user may find acceptable or desirable, character replacement has the ability to introduce a user's likeness into situations that a user may find offensive or otherwise undesirable. A user may have religious or moral objections to certain products or industries, and may not wish to watch himself or herself promoting certain products. Furthermore, a user may not desire to have his or her likeness introduced into an embarrassing situation or otherwise be portrayed in a negative light.

As a result, privacy and other legal and practical issues arising from the incorporation of users' likenesses into media content represent a significant impediment to widespread adoption of character replacement technologies in advertisements and other types of media content. Furthermore, these impediments arise principally from the simple fact that in most instances a content provider cannot predict with certainty what types of character replacement situations would be found to be acceptable or objectionable by different users, and it is impractical for a content provider or producer to obtain the expressed permission of each user prior to incorporating that user's likeness into media content. A significant need therefore exists in the art for a technical solution that enables users to control the manner in which their likeness may be incorporated into various types of media content using character replacement.

SUMMARY OF THE INVENTION

The invention addresses these and other problems associated with the prior art by providing an apparatus, program product and method that utilize a brokering service for use in controlling the incorporation of likeness data for an individual into a media presentation. The brokering service maintains a plurality of rulesets respectively associated with a plurality of individuals. Each ruleset is used to restrict the incorporation of likeness data associated with an associated individual into media presentations, typically through the inclusion of one or more rules configured to define conditions under which the likeness data for the associated individual may or may not be incorporated into a media presentation. The brokering service is capable of responding to requests for selected rulesets for different individuals by communicating the rulesets to various requesting entities.

In embodiments consistent with the invention, the rulesets may be maintained in user profiles, and to this extent, the embodiments hereinafter refer to a user profile brokering service. A user profile may additionally include a user's likeness data such that the ruleset and the likeness data controlled thereby are maintained as a single logical entity. A user profile may also include a buddy list that links to the user profiles of other users, thereby permitting relationships between users to be represented and used in connection with the generation of personalized media presentations. By providing a brokering service, therefore, the distribution and use of a user's likeness in media content may be effectively controlled in a standardized manner that addresses user's privacy concerns, thus facilitating the more widespread adoption of character replacement and like technologies.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 5 is a block diagram of an exemplary implementation of a ruleset suitable for use in a user profile in the distributed computing system of FIG. 1.

FIG. 6 is a block diagram of an exemplary implementation of likeness data suitable for use in a user profile in the distributed computing system of FIG. 1.

FIG. 7 is a block diagram of an exemplary implementation of a buddy list suitable for use in a user profile in the distributed computing system of FIG. 1.

FIG. 8 is a block diagram of an exemplary implementation of a digital media template suitable for use in the distributed computing system of FIG. 1.

FIG. 9 is a flowchart illustrating the program flow of a profile creation routine executed by the user profile broker service referenced in FIG. 1.

FIG. 10 is a flowchart illustrating the program flow of a media generation routine executed by the media processing service referenced in FIG. 1.

FIG. 12 is a flowchart illustrating the program flow of the generate personalized presentation routine referenced in FIG. 10.

FIG. 14 is a flowchart illustrating the program flow of an alternate implementation of the generate personalized presentation routine of FIG. 12.

FIG. 15 is a flowchart illustrating the sequence of steps in a generate personalized products method that may be utilized in an alternate environment to generate personalized product packaging for a run of products.

FIG. 16 is a flowchart illustrating the program flow of a generate personalized store advertisements routine that may be utilized in an alternate environment to generate personalized store advertisements at a retail location.

FIG. 17 is a flowchart illustrating the program flow of a preprocessing routine that may be utilized in the distributed computing system of FIG. 1.

DETAILED DESCRIPTION

Figure 1:
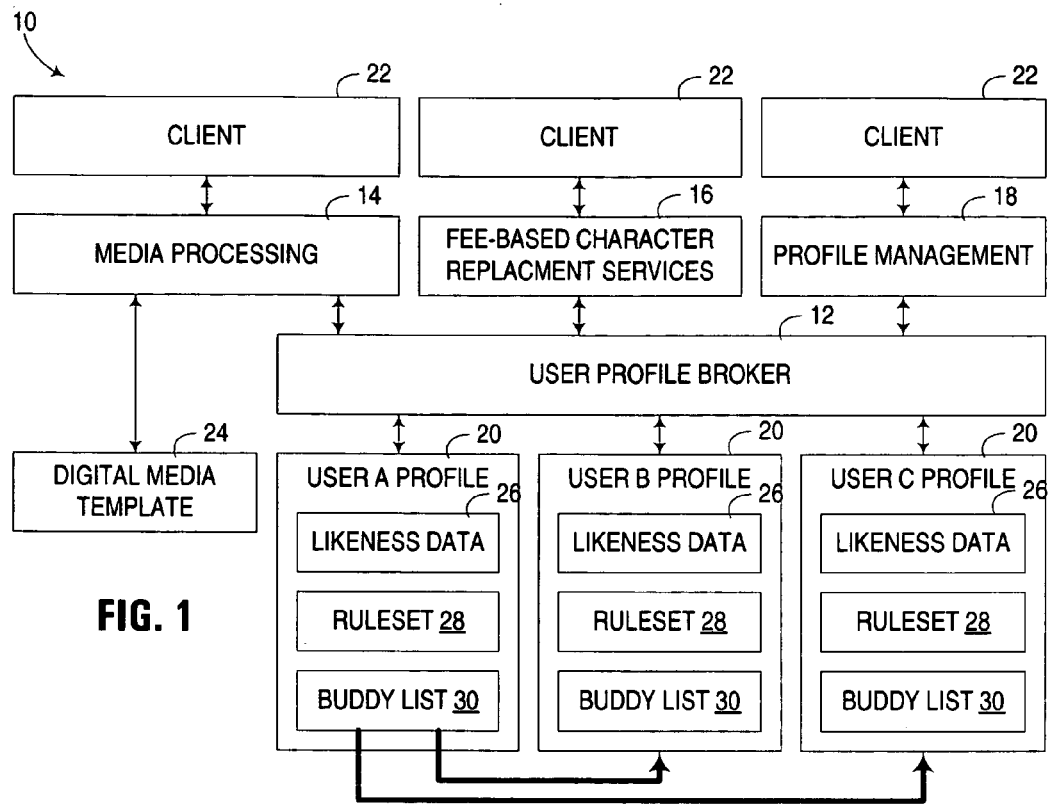
FIG. 1 is a block diagram of a distributed computing system incorporating user profile brokering and personalized media presentation generation services consistent with the invention.

The embodiments described hereinafter utilize user-defined rulesets that establish limitations and regulations for the incorporation of user likeness data in connection with character replacement within a digital media presentation. A ruleset provides a user with control over which situations and characters their likeness can be incorporated, and optionally, the intelligent integration of other users' rulesets by means of a "buddy list" similar to those utilized in connection with instant messaging, or another like mechanism for representing relationships between different users. A ruleset thus provides a control methodology that may be used to protect a user's privacy and likeness while furthering the more widespread adoption of character replacement technology.

In embodiments consistent with the invention, a user-defined ruleset effectively acts as a middleware broker between a user's likeness data (e.g., image, proportions, and other user characteristics) and the placement of this data into a media presentation. Each user may be permitted to set up their own personalized ruleset to restrict under which circumstances their likeness can be shown in a digital media presentation. Furthermore, in some embodiments, the ruleset may be made accessible to other users and systems to determine replacement relationships among multiple users and their associated rulesets. Therefore, character replacement can occur not only with an individual, but also with others related to that individual.

It will be appreciated that a wide variety of rules may be defined in a ruleset to control the various situations in which a user's likeness data can be incorporated into a personalized media presentation. Furthermore, it will be appreciated that the invention may be utilized in a number of different types of media presentations, and as such, a wide variety of different types of likeness data may be controlled using rulesets consistent with the invention. Furthermore, it will be appreciated that the manner in which a user's likeness data and ruleset may be distributed and accessed by other users and systems may vary significantly in different embodiments of the invention. In many embodiments, for example, a user's ruleset may be distributed collectively with the user's likeness data, effectively defining a distributable user profile for that user. In some embodiments, additional information may be distributed within a user profile, e.g., a buddy list or similar list of related users, which enables relationships between users to additionally affect how a personalized media presentation is generated.

While an extensive number of different applications are envisioned and discussed in greater detail below, one application particularly suited to the use of user-defined rulesets is the generation of personalized television or other video commercials. In such an application, each user may establish a user profile for himself or herself, including likeness data such as image scans or 3D modeling data representative of the user's face and/or body, as well as a ruleset that defines the situations under which the user's likeness data may be incorporated into a personalized commercial, and optionally, a buddy list that links to the user profiles of other users who are related to the user.

A commercial may be defined using a media template that includes a generic, scripted scenario from which a personalized commercial may be created. Then, based on each user's ruleset, a personalized commercial may be created for each user using the same media template, with character replacement being controlled by the ruleset of each user and of those in his or her buddy list. The process may be automated, so that each commercial will systematically choose character replacement based on the defined rules in the user's ruleset and buddy lists. Each user is therefore presented with commercials in which he or she is shown as a character in the commercials.

In one embodiment, for example, personalized television commercials may be generated at a central source and distributed to a user's set-top box or television for display to the user. In another embodiment, generic television commercials, e.g., defined in media templates, may be distributed to a user's set-top box or television, with the set-top top box or television handling the performance of generating the personalized media presentations. It will also be appreciated that various aspects of the herein-described media presentation generation functionality may be distributed between a central service and a user's set-top box or television in these embodiments.

Turning now to the Drawings, wherein like numbers denote like parts throughout the several views, FIG. 1 illustrates an exemplary distributed computing system 10 including user profile brokering and personalized media presentation generation services consistent with the invention. In particular, distributed computing system incorporates a user profile broker service 12 that is configured to manage and distribute a set of user profiles 20 to various applications or services requiring access thereto, as well as a media processing service 14 suitable for generating personalized or customized media presentations based upon such user profiles. As will become more apparent below, media processing application 14 may operate, for example, by taking a digital media template 24 and generating a personalized or customized media presentation therefrom based upon personalized likeness data and rules incorporated into user profiles 20 that are retrieved using broker service 12.

In addition, as will be discussed in greater detail below, the user profiles managed by broker service 12 may be distributed to a number of other services or applications, e.g., various fee-based character replacement services 16. Furthermore, in order to create, edit or otherwise manage user profiles, a profile management application or service 18 may be used. It will be appreciated that profile management functionality may be provided as a separate component from broker service 12 and/or may be incorporated into broker service 12 in various embodiments.

Each user profile 20 typically includes likeness data 26 and a ruleset 28, and may additionally include a buddy list 30 or other data structure that refers to the user profiles associated with other users (e.g., as shown in FIG. 1, where the user profile for user A includes a buddy list 30 that references the user profiles for users B and C). Likeness data 26 generally corresponds to data that is capable of describing a user's likeness, and may be used, for example, for insertion or incorporation into a personalized digital media presentation and/or for otherwise personalizing a digital media presentation. Ruleset 28 typically includes one or more rules that are used to control where and/or how likeness data for a user may be used in a personalized digital media presentation. The manner in which likeness data 26 and ruleset 28 from a particular user profile 20 is used by an application or service will vary depending upon the particular application/service. For example, for media processing application/service 14, a ruleset 28 will generally control the circumstances under which likeness data 26 will be incorporated into a digital media template 24 to generate a personalized digital media presentation.

It will be appreciated that broker service 12, applications/services 14, 16 and 18, user profiles 20, clients 22 and templates 24 may each be resident in various computers that are interconnected with one another in a distributed manner, e.g., via any combination of local area networks (LAN's), wide area networks (WAN's) and/or other networking topologies known in the art (not shown in FIG. 1). Individual components may be physically located in close proximity with other members, or may be geographically separated from other members, as is well known in the art. Moreover, a wide variety of interconnection types, network types, member types, etc., may be permitted to coexist with one another in an efficient and reliable manner in distributed computing system 10.

Figure 2:
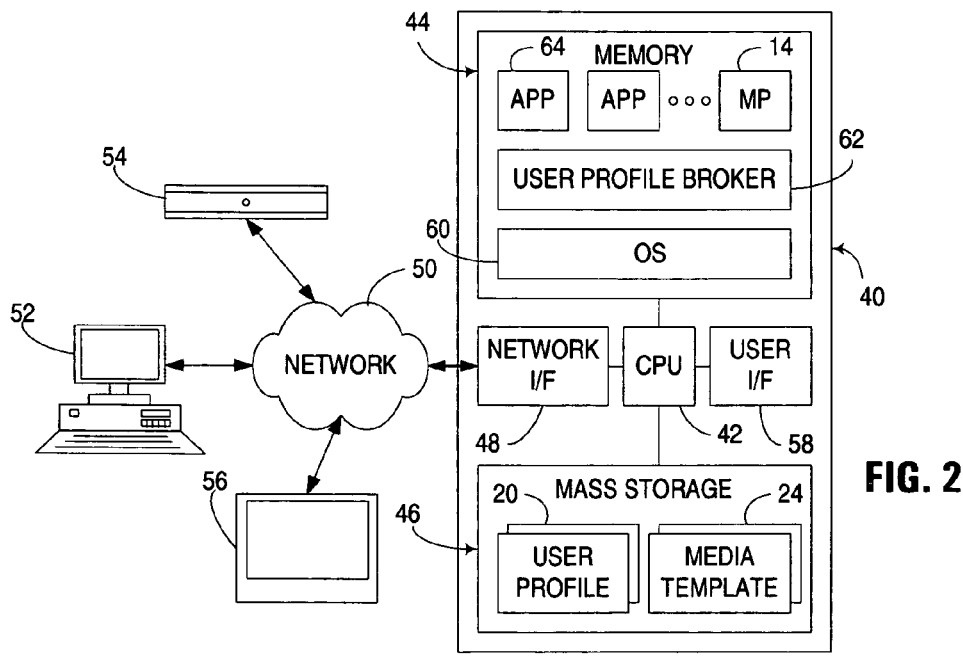
FIG. 2 is a block diagram of a client-server implementation of the distributed computing system of FIG. 1.

As an example, as shown in FIG. 2, user profile brokering and personalized digital media presentation generation may be implemented in a client-server environment, where an apparatus 40, implemented as a single computer or alternatively a cluster or other network of multiple computers, is interfaced with a plurality of client devices 52, 54, 56 coupled thereto over a network 50. Apparatus 40 generically represents, for example, any of a number of multi-user computers such as a network server, a midrange computer, a mainframe computer, etc. However, it should be appreciated that the invention may be implemented in other computers and data processing systems, e.g., in single-user computers such as workstations, desktop computers, portable computers, handheld computers, and the like, or in other programmable electronic devices (e.g., incorporating embedded controllers and the like), e.g., set-top boxes, video games, digital video recorders, satellite or cable receivers, cell phones, etc. Moreover, apparatus 40 may be implemented using multiple networked computers, e.g., in a cluster, a computational grid, or other distributed computing system. Apparatus 40 will hereinafter also be referred to as a "computer," although it should be appreciated that the term "apparatus" may also include other suitable programmable electronic devices consistent with the invention.

Computer 40 typically includes a central processing unit (CPU) 42 including one or more processors coupled to a memory 44, which may represent the random access memory (RAM) devices comprising the main storage of computer 40, as well as any supplemental levels of memory, e.g., cache memories, non-volatile or backup memories (e.g., programmable or flash memories), read-only memories, etc. In addition, memory 44 may be considered to include memory storage physically located elsewhere in computer 40, e.g., any cache memory in a processor in CPU 42, as well as any storage capacity used as a virtual memory, e.g., as stored on a mass storage device or on another computer coupled to computer 40.

For non-volatile storage, computer 40 typically includes one or more mass storage devices 46, e.g., a floppy or other removable disk drive, a hard disk drive, a direct access storage device (DASD), an optical drive (e.g., a CD drive, a DVD drive, etc.), and/or a tape drive, among others. Furthermore, computer 40 may also include an interface 48 with one or more networks 50 (e.g., a LAN, a WAN, a wireless network, and/or the Internet, among others) to permit the communication of information with other computers and electronic devices, e.g., one or more client devices such as a client computer 52, a client set-top box 54, and a client television 56.

Computer 40 also typically receives a number of inputs and outputs for communicating information externally. For interface with a user or operator, computer 40 typically includes a user interface 58 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal, e.g., via a client 52, 54, 56 coupled to computer 40 via network 50 and network interface 48. It should be appreciated that computer 40 typically includes suitable analog and/or digital interfaces between CPU 42 and each of components 44, 46, 48 and 58 as is well known in the art.

Computer 40 operates under the control of an operating system 60, and executes or otherwise relies upon various computer software applications, components, programs, objects, modules, data structures, etc. For example, user profile broker component 62 may be resident to implement a portion of the aforementioned user profile broker service 12, and which is accessible to one or more applications 64 further resident on computer 40 (e.g., media processing application 14). Various additional components, e.g., user profiles 20 and media templates 24, may be stored in mass storage 46 and retrieved into main memory 44 as needed.

Moreover, additional applications, components, programs, objects, modules, etc. may also execute on one or more processors in another computer coupled to computer 40 via a network, e.g., in a distributed or client-server computing environment, whereby the processing required to implement the functions of a computer program may be allocated to multiple computers over a network. As an example, it will be appreciated that various portions of the functionality implemented in computer 40 may alternatively be implemented in various client devices, such as a client computer 52, a client set-top box 54 (e.g., a DVR, a cable receiver, a satellite receiver, etc.), or a client television 56.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable or signal bearing media used to actually carry out the distribution. Examples of computer readable or signal bearing media include but are not limited to tangible, recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

It will also be appreciated that the various embodiments of the invention are also capable of being implemented as a service that is implemented on one or more computers, and that is made available to clients having access to the service. Such a service may be provided, for example, via a computational utility, a network service, a grid service, a web service, etc.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Figure 3:
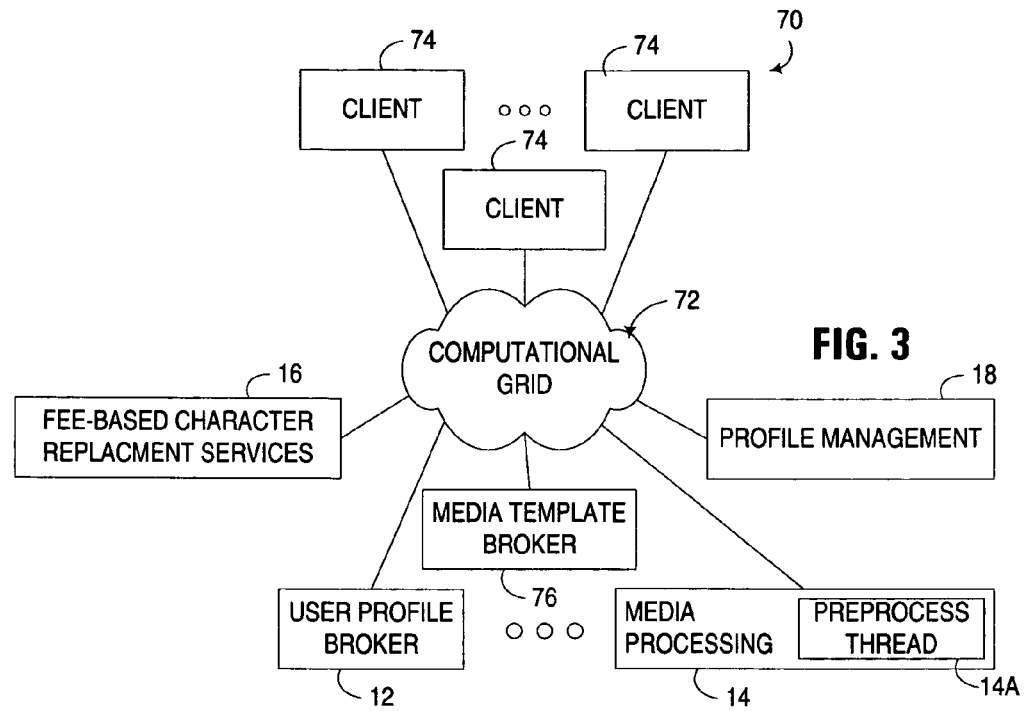
FIG. 3 is a block diagram of a grid computing implementation of the distributed computing system of FIG. 1.

As noted above, the aforementioned functionality may be implemented in a number of alternate computer environments. FIG. 3, for example, illustrates a grid-based environment 70 whereby a computational grid 72 is used to provide one or more clients 74 with access to various grid-supported services, e.g., user profile broker service 12, media processing service 14, fee-based character replacement services 16, profile management services 18, as well as a media template broker service 76. In such an environment, practically any combination of computers may implement various aspects of the herein-described functionality.

Figure 4:
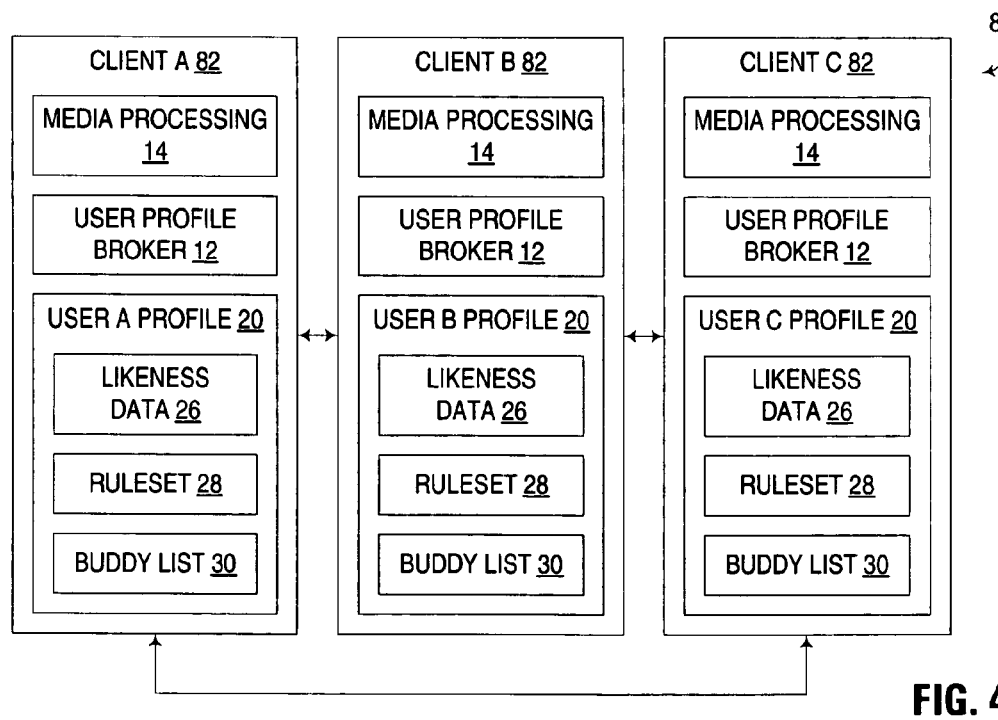
FIG. 4 is a block diagram of a peer-to-peer implementation of the distributed computing system of FIG. 1.

As another example, FIG. 4 illustrates a peer-to-peer environment 80 wherein each of a plurality of clients 82 include local implementations of a user profile broker service 12 and a media processing service 14, with local copies of various user profiles 20 (each including likeness data 26, a ruleset 28 and a buddy list 30) stored on each client. It will be appreciated that a central or distributed database may be utilized by broker service 12 to manage the collective set of user profiles 20 and assist in the distribution of such profiles to specific clients as needed.

Those skilled in the art will recognize that the exemplary environments illustrated in FIGS. 2-4 are not intended to limit the present invention. Indeed, those skilled in the art will recognize that other alternative hardware and/or software environments may be used without departing from the scope of the invention.

Data Structures

As discussed above in connection with FIG. 1, system 10 relies on a number of data structures to implement user profile brokering and personalized digital media presentation generation consistent with the invention. One such structure is a user profile 20, which includes likeness data 26, a ruleset 28, and optionally a buddy list 30.

Ruleset 28 defines the conditions or circumstances under which a user's likeness data 26 may be incorporated into a personalized digital media presentation. As such, a ruleset provides a control methodology that may be used to protect a user's privacy and likeness while furthering the more widespread adoption of character replacement technology. A ruleset, in this regard defines at least one condition under which a user's likeness data may or may not be incorporated into a media presentation.

One exemplary implementation of a ruleset 28 is illustrated in FIG. 5. In this implementation, a ruleset is defined to include one or more ruleset profiles 100, which may be used to define different sets of rules to be applied in different situations, e.g., in public, in private, at work, at home, as in many instances, the types of presentations that a user might find acceptable with friends or in private could be considered embarrassing or inappropriate by that same user in a public or work environment.

The manner in which different ruleset profiles are selected may vary in different embodiments. For example, a user may manually select an active profile, or in the alternative, a profile may be selected based upon the computer or other presentation device that a presentation is to be displayed or played back (e.g., the user's home computer or television vs. a billboard or public display). Moreover, an active profile may be automatically selected based upon the detected number of potential viewers, e.g., if a presentation is to be displayed in an online community where members go online and offline from time to time. It will also be appreciated that, rather than utilizing separate profiles, the selection of different sets of rules pertaining to a particular profile (e.g., public v. private) may be implemented within the rules themselves, thereby eliminating the need to define separate ruleset profiles for a particular user.

Each ruleset profile 100 in ruleset 28 includes one or more rules that define the circumstances in which a user's likeness data may or may not be permitted to be used in a particular media presentation or particular attributes that may or may not be used. An innumerable number of different types of rules may be used in different embodiments, of which four different primary types are illustrated in FIG. 5: character-based rules 102, media-based rules 104, relationship-based rules 106 and inherited rules 108.

A character-based rule 102 generally refers to a rule that is based upon an attribute of a character in a media presentation. For example, a character-based rule may be based upon a role preference, e.g., to permit or not permit a user's likeness to be used to depict a profession or hobby such as an athlete, an airline pilot, a white water rafter, etc. A role preference may also be based upon a character's activity, e.g., or to permit or not permit a user's likeness to be used to depict someone performing various activities such as cooking, dancing, cleaning, eating, kissing, riding a horse, etc. A character-based rule may also be based upon geography and/or accents, e.g., to permit or not permit a user to be cast for the role of a New Yorker, a southerner, a Frenchman, etc. A character-based rule may also be based upon personality, e.g., to permit or not permit a user's likeness to be used for a fool, a rude person, an unintelligent person, an antagonist, a protagonist, a depressed person, a happy person, an angry person, etc.

A media-based rule 104 generally refers to a rule that is based upon an attribute of a media presentation itself. For example, a media-based rule may be based upon a product preference, e.g., to permit or not permit a user's likeness to be used to promote a particular brand of product such as Nike, Coca-Cola, Makers Mark, etc., or to permit or not permit a user's likeness to be used to promote a particular type of product such as shoes, clothes, soft drinks, alcohol, etc. A media-based rule may also be based upon a morality, political or religious preference, e.g., to permit or not permit a user's likeness to be used in situations involving sex, alcohol, gambling, political advertisements, etc. A media-based rule may also be based upon the other characters in a media presentation. As an example, a media-based rule may be based upon co-star preferences. By doing so, a user could designate certain actors as being "irreplaceable" so that the user would be able to co-star in a presentation with their favorite celebrities.

A relationship-based rule 106 generally refers to a rule that is based upon a relationship between characters and/or between users, e.g., to control the incorporation of friends and relatives in other characters in a presentation. For example, a relationship-based rule may designate that when a user is cast as mother or father, and another character in the presentation plays a son or daughter, the user's own son or daughter is cast in the role. Relationships (such as mother, daughter, friend) within the buddy list so the ruleset can make "smart" choices on character replacement (in a diamond commercial a user's husband will propose to her rather than her brother). Relationship-based rules may also be based upon online status, so that only users who are currently online will be inserted into a presentation, and backup or secondary users may be defined to enable other users to take the place of an offline user. Relationship rules may also be persistent in nature, e.g., so a user can be cast as the parent of another user in all presentations.

In addition, rule matching may be used to ensure that certain rules are reciprocated by other users. For example, if user A establishes a boyfriend/girlfriend relationship with user B, it may be necessary for user B to also define a similar rule for user A's rule to take effect. Furthermore, rules may be used to expressly block other users, e.g., if one user does not want to ever appear with another particular user.

An inherited rule 108 generally refers to a rule that is inherited from another ruleset. User profiles may be implemented, for example, using object-oriented technology, and as such, inheritance may be used to provide the ability to extend or override rules in a profile defined for another individual or type of individual. Generic rulesets may be defined for certain types of users, e.g., adults, children, elderly people, young people, people from a certain country or region, etc., while enabling individual users to modify the inherited rulesets as they see fit. By doing so, a user may not have to manually define a complete ruleset for himself or herself.

A inherited rule 108 may also refer to a rule that is provided as a result of a subscription to a particular rules group. As an example, a religious group may establish a default ruleset for its members, whereby any member who wishes to inherit the rules of the group may subscribe to receive the preferred rules for the group. A subscription service may also be used to automatically update rulesets as needed.

Inherited rules may be overridden, or in some instances, may not be capable of being overridden. For example, an organization could define a default set of inherited rules for its employees that could not be overridden for presentations that are generated in a work environment.

It will be appreciated that any number of known data structures and logic representations may be used to represent rules, including boolean logic, data structures similar to access control lists (ACL's) used in connection with security management, etc. As one example, rules may be given priority to allow one rule to override another rule having a lower priority. For example, if priorities are from 1 (lowest) to 10 (highest), then a rule with priority 10 could be defined to never be broken, while a rule with a priority from 1-9 could be overruled by a rule with a higher priority. As an example, a user could have one rule such as "I wish to be a runner within a commercial" set with a priority of 8, with another rule such as "I'd prefer not to be an antagonist" set with a priority 5, whereby as a result of the relative priorities, a user may still be cast as an antagonistic runner. Rules may be used to grant permissions (i.e., permission is denied unless explicitly permitted by a rule) and/or to deny permissions (i.e., permission is granted unless explicitly prohibited by a rule).

Practically any condition for which it is desirable to restrict the use of a user's likeness may be utilized in a ruleset consistent with the invention. Therefore, the invention is not limited to the specific examples presented herein.

Now turning to FIG. 6, one exemplary implementation of a data structure suitable for storing likeness data is illustrated at 26. Likeness data may include, for example, image data 120, 3D rendering data 122, video data 124 or practically any other pictorial data that may be utilized to display a two or three dimensional image of the likeness of a user. Such data may also include likeness data associated only with a part of a user, e.g., the user's face, head, body, etc., whereby such data may be utilized in connection with other data to generate a composite image of a user's likeness (e.g., where a depiction of a user's face is superimposed on another body). 3D rendering data 122, for example may include information such as a 3D model and/or any attributes that may be used to customize a standard 3D model to depict a user's particular likeness, as is well known in the art (e.g., body attributes related to weight, height, body shape, nose shape, eye color, eye shape, hair color, hair style, mouth shape, complexion, skin tone, gender, style, clothing, etc.). The rendering data may also include similar 2D rendering data in some embodiments In addition to or in lieu of image data, likeness data 26 may also include voice data 126, in the form of recordings of the user's voice and/or data used by a voice synthesis engine to synthesize a voice similar to that of the user. Furthermore, personality profile data 128 may be provided to characterize the user's personality, e.g., introvert, extrovert, high strung, even tempered, hot headed, etc.

Likeness data 26 may also include possession likeness data 130, providing identifiers and/or likeness data associated with a user's possessions, e.g., pets, clothing, automobile, home, surroundings, etc. By doing so, it becomes possible for a personalized media presentation to potentially incorporate a user's possessions within the presentation along with the user.

Likeness data 26 also includes descriptive attributes 132, representing other attributes associated with a user's likeness. For example, biographical or demographic information such as name, birth date, age, gender, race, address, residency, income, etc. may be associated with a user's likeness. In addition, attributes that identify relationships with other users (e.g., friends, parents, siblings, offspring, etc.) may be included.

It will be appreciated that practically any data that is associated with identifying a user may be incorporated into likeness data 26. Furthermore, it will be appreciated that depending upon the application, some of the aforementioned information may be omitted, and may even be stripped from some copies of a user's profile (e.g., those distributed to a client by a server), depending upon the particular media presentation that will be generated using the user's likeness data. For example, in an implementation that generates still or moving images, no voice data may be required or provided within the data structure for likeness data 26.

Now turning to FIG. 7, one exemplary implementation of a buddy list is illustrated at 30. List 30 may be implemented using any suitable data structure to identify one or more other users that user may wish to have incorporated into a media presentation. In the illustrated embodiment, buddy list 30 includes a list of entries 134 that identify other users, typically via pointers or links 136 to the user profiles of those other users. Each entry 134 may also include one or more group/relationship attributes 137 that indicates the groups and/or relationships with which the buddy is associated (e.g., to identify a particular buddy as someone's mother/father, sister/brother, spouse, etc.) and an online indicator 138 that indicates whether the other user is currently online. Furthermore, each entry 134 may optionally include additional likeness data regarding that particular user that is not provided in the user's profile 20. For example, it may be desirable for a particular user to customize the profiles of the users in their personal buddy list with additional information. Practically any other data structure capable of providing the ability to access the user profiles of other users related to a particular user may be used in the alternative.

Now turning to FIG. 8, as noted above, a ruleset operates as a broker between a user's likeness data and the placement of this data into a digital media presentation. To this extent, the generation of a digital media presentation is typically facilitated through the use of a digital media template 24 that characterizes the presentation for the purpose of determining whether a user's likeness data may be incorporated into the media presentation. In the implementation of FIG. 8, media template 24 is used for a commercial or other video presentation, and includes a plurality of character data structures 140, each having one or more character attributes 142, one or more media attributes 144 and a set of media frames 146.

Each character data structure 140 represents a character in the digital media presentation. As seen in FIG. 8, some of the characters may be replaceable, while others may be designated as irreplaceable, and thus prohibited for character replacement. Included within the data structure may be data used to generate the character in the presentation. In an implementation where a user's face is to be superimposed on a character, for example, the character data structure may store data such as the coordinates of the face or head of the character in a three dimensional space for each media frame 146, to facilitate correct positioning of a user's face. It will be appreciated that the type of information needed to incorporate a character in a presentation will vary depending upon the media involved and the type of presentation being generated. Moreover, it will be appreciated that a character data structure may also include default data that is used whenever no character replacement is performed with respect to that character.

The character attributes 142 for each character represent the characteristics of each character, and are typically tested by a user's ruleset in connection with determining whether a user will be assigned to that character when generating a personalized media presentation (e.g., particularly with regard to character-based rules 102 and relationship-based rules 106). In the case of irreplaceable characters, the character attributes may also be tested in connection with determining whether a user will be assigned to another character (e.g., in the instance where a rule specifies that a user would like to co-star with a particular celebrity, an irreplaceable character may have a character attribute that identifies that celebrity as the actor playing the character). It will be appreciated that practically any attribute that is capable of affecting how and/or whether a particular user will be cast in the role of that character may be stored in a character data structure 140 consistent with the invention. Examples of suitable attributes are discussed above in connection with character-based rules 102.

The media attributes 144 for a media template represent those characteristics of the media that may be tested by a user's ruleset (e.g., particularly with regard to media-based rules 104). Information such as the type and/or brand of product being promoted, plot characteristics, media display options (e.g., cartoon, reality television), medium (e.g., television, cell phone, billboard, internet), etc. may be stored as media attributes. It will be appreciated that practically any attribute that is capable of affecting how and/or whether a particular user will be cast in a particular media presentation may be stored as a media attribute 144 consistent with the invention. Examples of suitable attributes are discussed above in connection with media-based rules 104.

Attributes assigned to a media template may be generated by the creator and/or the distributor of the media template. In the alternative, a third party may add attributes to a media template, e.g. a ratings service or other group. Furthermore, in some instances it may be desirable to permit users to incorporate attributes (e.g., in the form of digital tags or keywords) to assist in characterizing a media template.

As noted above, a media template 24 may also include a set of media frames 146, representing in this instance the frames of video that are processed to generate a personalized media presentation. It will be appreciated that for other types of media presentations, different types of presentation data may be incorporated into a template. Furthermore, it will be appreciated that a media template 24 may provide no presentation data, and may merely characterize presentation data stored separate from the template. In still other embodiments, a media presentation may be generated from the ground up using the information in media template 24, whereby no preexisting "template" presentation data may exist prior to generation of the media presentation.

It will be appreciated that the data structures described herein may be altered and/or other data structures may be utilized in the alternative. Other modifications and variations will be apparent to one of ordinary skill in the art having the benefit of the instant disclosure.

User Profile Creation and Distribution

Various mechanisms may be used to create user profiles consistent with the invention. For example, FIG. 9 illustrates a profile creation routine 200 that may be executed by user profile broker service 12, optionally via a separate profile management service 18 (FIG. 1). Routine 200 begins in block 202 by creating a profile for the user, which may incorporate the entry of initial personal data about the user, including name, gender, and other biographical and demographic data. Next, in block 204, a user may be instructed to select a profile to work with, e.g., the recently created profile discussed above. Once the profile is selected, control then passes to block 206, where a user selects a "create rule" option to add a rule to the ruleset established for the profile.

Next, in block 208, a new rule is constructed from various user-specified attributes, and in block 210, the user assigns a priority to the rule. Once the rule has been specified, the rule is then added to the ruleset in block 212. If more rules are to be created for the profile, block 214 returns control to block 204. Otherwise, control passes to block 216, where a user selects an "add likeness data" option, whereby user-specified likeness data is added to the profile in block 218.

Next, in block 220, a user selects an "add buddies" option, whereby a user-specified buddy is added to the buddy list for the user profile in block 222. At this time, verification may also be performed to ensure that any user-specified buddies have associated user profiles available via the broker service. Block 224 determines whether the user wishes to add another buddy to the buddy list, and if so, returns control to block 222. Otherwise, the creation of the profile is complete.

It will be appreciated that various graphical user interface controls may be used to assist a user in creating a user profile. For example, the entry of likeness data, rules, and buddies may be performed in any order, e.g., using buttons, lists, check boxes, and other user controls to facilitate the entry of data by a user. Moreover, some data regarding a user profile may be automatically generated based upon other information known about a user. Furthermore, a user may be required to provide previously created images or other likeness data, or to have his or her likeness captured by a capture device (e.g., a camera, a microphone, etc.), during the process of creating a profile. Rules may also be defined using various user interface controls, and may be represented using various languages or logic, e.g., boolean logic (and, or, not), conditional logic (if-then), natural language, etc.

It may also be desirable to provide default settings in association with a newly created profile to reduce the amount of data entry required by a user. Moreover, rules may be grouped together to provide default rulesets reflecting different degrees of permissiveness. Graphical controls such as sliders for example, may be used to select ranges of values for groups of parameters, e.g., to select along a continuum between a conservative ruleset and a liberal 'anything goes' setting. It may also be desirable to utilize a ruleset "wizard" to provide a user with default attributes that should be filled out by a user in order to create a practical base set of rules.

It will be appreciated that once a profile is created, a profile may be edited and revised at a later date using similar user interface controls. Moreover, it may be desirable to password protect, or otherwise require authorization to create, delete, edit, and/or distribute a profile. Other profile management functionality may be used consistent with the invention, as will be appreciated by one of ordinary skill having the benefit of the instant disclosure.

Once a profile has been created, the profile may be stored in a central or distributed database and made available to various media processing services. Profiles may also be accessible by other users, whether to create personalized media presentations, or to permit other users to view the profile information stored for a particular user.

Access to profiles may be limited to those users having explicit permission (e.g., via the aforementioned buddy lists, or via access control lists), or in the alternative, greater access to profiles may be provided. For example, several people within a household may be permitted to have their own buddy lists, and presentations may be generated using an intersection of rules to match characters with individuals from multiple buddy lists. Additionally, a user may be permitted to "subscribe" to pull people into their buddy list from different, broader communities (i.e. a user could make himself or herself available to the entire user base of an online community, or the entire employee directory for the user's employer), assuming each pulled user has "published" himself or herself to that community for use.

In some embodiments, user profiles may omit the actual likeness data for a represented user. In other embodiments, user profiles may merely incorporate links or references to users' likeness data. It may be desirable, for example, to maintain likeness data for a user locally on that user's local device, while maintaining user profiles in a central database.

Personalized Media Presentation Generation

Using the aforementioned user profiles, any number of different personalized digital media presentations may be generated. For example, FIG. 10 illustrates a media generation routine 230, which may be used by a media processing service to generate a personalized media presentation from a digital media template. Routine 230 begins in block 232 by obtaining the media template. Thereafter, an assign characters routine 234 is called to assign the user and/or his or her buddies to various characters defined in the media template. Once the characters are assigned, a generate personalized presentation routine 236 is called to generate a personalized presentation with likeness data for the user and/or his or her buddies. At this point, the media presentation is ready for display, storage and/or communication to one or more recipients.

In addition, it may be desirable to enable users to subscribe to receive notifications of when their likeness is used in a media presentation. As such, once the presentation is complete, block 238 determines whether notification is requested. If so, control passes to block 240 to notify the user that the presentation has been created. If not, block 240 is bypassed, and control passes directly to block 242.

It will be appreciated that the manner in which a user is notified will vary in different embodiments. For example, where the presentation is a personalized television commercial, the user may be notified via an icon or message on the television prior to and/or during the presentation to alert the user that the commercial is personalized. In other embodiments, the user may be notified via email, an instant message, an audible alert, SMS, or even via distinct indicators (e.g., on a set-top box).

In addition, it may be desirable in some embodiments to enable a user to be notified if his or her likeness is being used in another user's personalized presentation. As such, a user may also be provided with a copy or a link to a personalized presentation created on behalf of another in connection with a notification.

It may also be desirable to enable a user to save or record a personalized media presentation. As such, block 242 determines whether the user has enabled recording of personalized presentations. If so, control passes to block 244 to save the media presentation file, prior to displaying and/or displaying the media presentation in block 246. Otherwise, block 244 is bypassed, and control passes directly to block 246. It will be appreciated that a copy of a media presentation may be saved locally on behalf of a user, may be retained on a server, or may even be stored on a removable medium (e.g., via burning to DVD or CD).

It will be appreciated that the manner in which a presentation may be displayed and/or distributed may vary widely in different embodiments, e.g., based upon whether the presentation is generated local to a display device and/or storage medium, or remote from a display device and/or storage medium.

Figure 11:
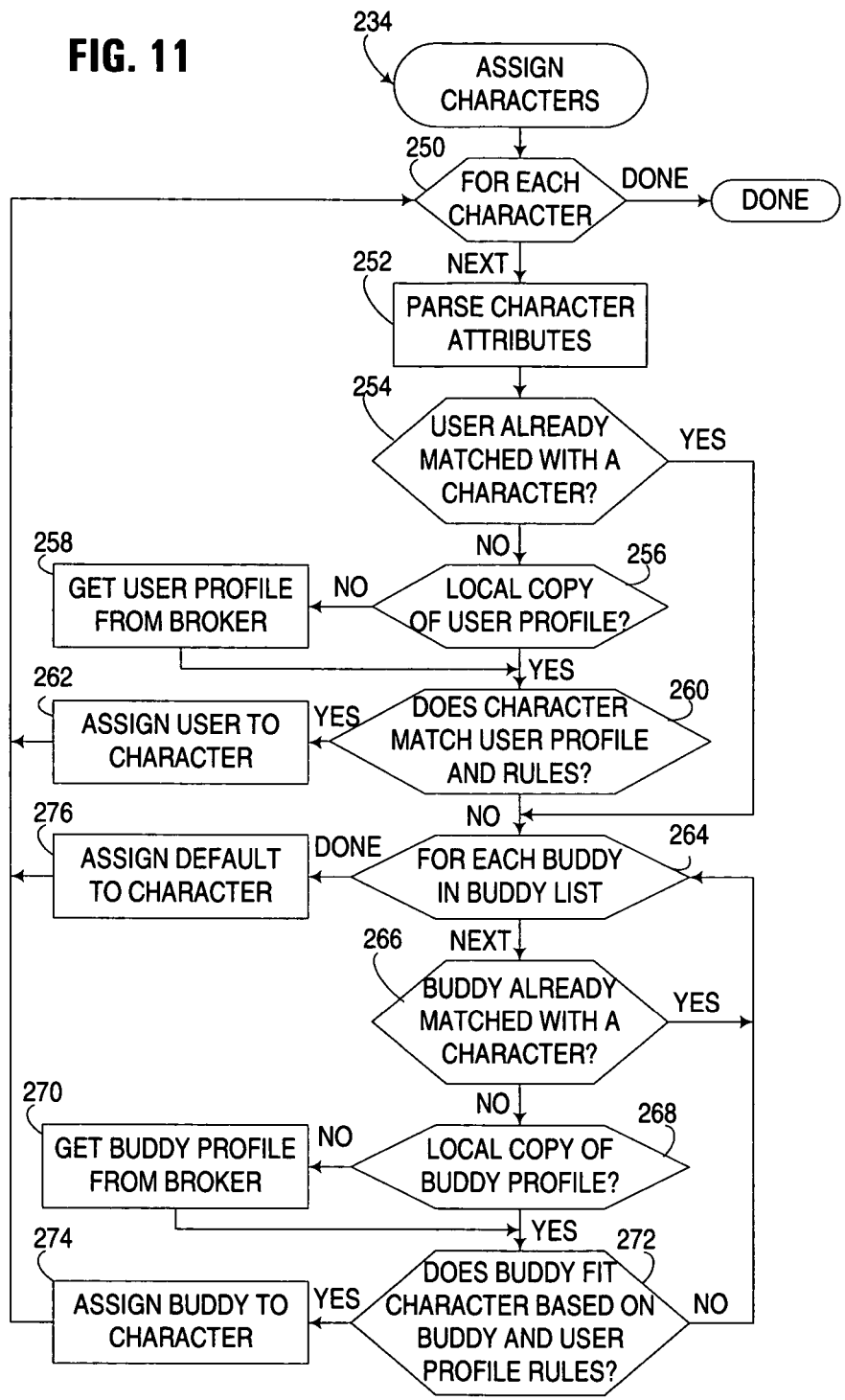
FIG. 11 is a flowchart illustrating the program flow of the assign characters routine referenced in FIG. 10.

FIG. 11 illustrates assign characters routine 234 in greater detail. Routine 234 begins in block 250 by initiating a FOR loop for each character defined in the media template. For each such character, control passes to block 252 to parse the character attributes, and thus determine those attributes that may be tested when determining whether a user's or buddy's ruleset permits assignment of their likeness to the character. It will also be appreciated that various media attributes may also be parsed in routine 234 to determine whether any media-based rules permit a user's likeness data to be incorporated into a particular media presentation.

Next, block 254 determines whether the user has already been matched with a character in the template. If not, control passes to block 256 to determine whether a local copy of the user profile is available (and optionally, whether a local copy is current). If not, control passes to block 258 to obtain the user's profile from the user profile broker service. If a local copy was already available, or after obtaining a local copy, control then passes to block 260 to determine whether the character matches the user's profile.

In particular, the rules in the ruleset associated with the current user are applied to the character attributes for the character, and, if appropriate, the media attributes for the media template, to determine whether assignment of the current user to the character is permitted. In connection with such analysis, one of multiple ruleset profiles may be selected based upon the scenario in which the media template will be presented (e.g., at home, at work, in public, etc.).

If the character matches the user's profile, control passes to block 262 to assign the user to the character Control then returns to block 250 to process additional characters in the template.

Returning to block 260, if assignment of the character to the user is not permitted under the user's ruleset, control passes to block 264 to initiate a FOR loop to process each buddy in the user's buddy list to attempt to match the character with one of the user's buddies. Likewise, returning to block 254, if the user was determined to have already been matched to a character, block 254 passes control directly to block 264.

For each buddy in a user's buddy list, block 264 passes control to block 266 to determine whether the buddy is already matched with a character. If so, control passes to block 264 to process other buddies. If not, control passes to block 268 to determine whether a local copy of the buddy's user profile is available (and optionally, whether a local copy is current). If not, control passes to block 270 to obtain the buddy's user profile from the user profile broker service. If a local copy was already available, or after obtaining a local copy, control then passes to block 272 to determine whether the buddy fits the character based upon the buddy's user profile, as well as that of the user.

If it is determined that the buddy fits the character, control passes to block 274 to assign the buddy to the character. Control then returns to block 250 to process any remaining characters in the template, and once all such characters have been processed, routine 234 is complete. Otherwise, block 272 passes control to block 264 to process any remaining buddies on the buddy list. If block 264 processes each buddy on the buddy list without making an assignment, block 264 passes control to block 276 to assign a default actor or likeness to the character, prior to returning control to block 250. In some embodiments, stock likeness data may be provided, and may optionally be obtained from the user profile broker service or another source as needed, e.g., from a database of likeness data for actors or other famous individuals. In other instances, default likeness data may be supplied with the media template, or the media template itself may already have default characters displayed in the non-personalized media.

It will be appreciated that the determination of whether a buddy fits a character in block 272 will vary in different embodiments. Typically, the rulesets of the user and the buddy are reconciled to determine whether the rules of each of the user and the buddy permit the assignment of the buddy to the character. The rulesets may be character-based, media-based, as well as relationship-based, and as noted above, some relationships may need to be reciprocated to enable some relationship-based rules to take effect. As an example, a buddy may have a rule that precludes a former girlfriend from incorporating his likeness into one of her personalized presentations, irrespective of the fact that she has established a boyfriend-girlfriend relationship in her user profile. Also, as noted above, an additional condition that may be incorporated into block 272 is that the buddy currently be online, e.g., if a rule is defined in the user's profile to only allow for character replacement with online buddies.

Various alternative algorithms may be used to assign characters in different embodiments. For example, it will be appreciated in some embodiments, character assignment may be based upon a "best match" scenario. In such embodiments, each character may be tested against the rulesets for each user and buddy profile, and score each character to find the most appropriate assignments for each character.

Now turning to FIG. 12, generate personalized presentation routine 236 is illustrated in greater detail. In this implementation, it is assumed that the media template includes a set of pre-generated media frames for a video presentation, along with any information required for performing character replacement in each media frame (e.g., where only facial images are replaced, the coordinate data for the faces of the default actors in each media frame). Routine 236 thus begins in block 280 by initiating a FOR loop to process each media frame in the template. For each such frame, block 282 optionally determines whether a processed frame is already available, e.g., if the frame has already been generated as a result of a predictive or background process, or has already been generated on behalf of another user. The processed frame may be stored locally, or optionally, stored remotely, and as such, if a processed frame is found, block 282 passes control to block 284 to pull the processed frame from the database. If the processed frame is available from a remote location, block 284 may thus include retrieval from the remote location. Block 284 then passes control to block 280 to process additional media frames.

Returning to block 282, if no processed frame currently exists, control passes to block 286 to obtain the likeness data for each character in the frame from the respective user profiles of the users assigned to the characters. Control then passes to block 288 to insert the likeness data in the blank (or unpersonalized) media frame, i.e., to perform character replacement in the media frame. Control then returns to block 280 to process additional media frames. Once all media frames are processed, routine 236 is complete.

Figure 13:
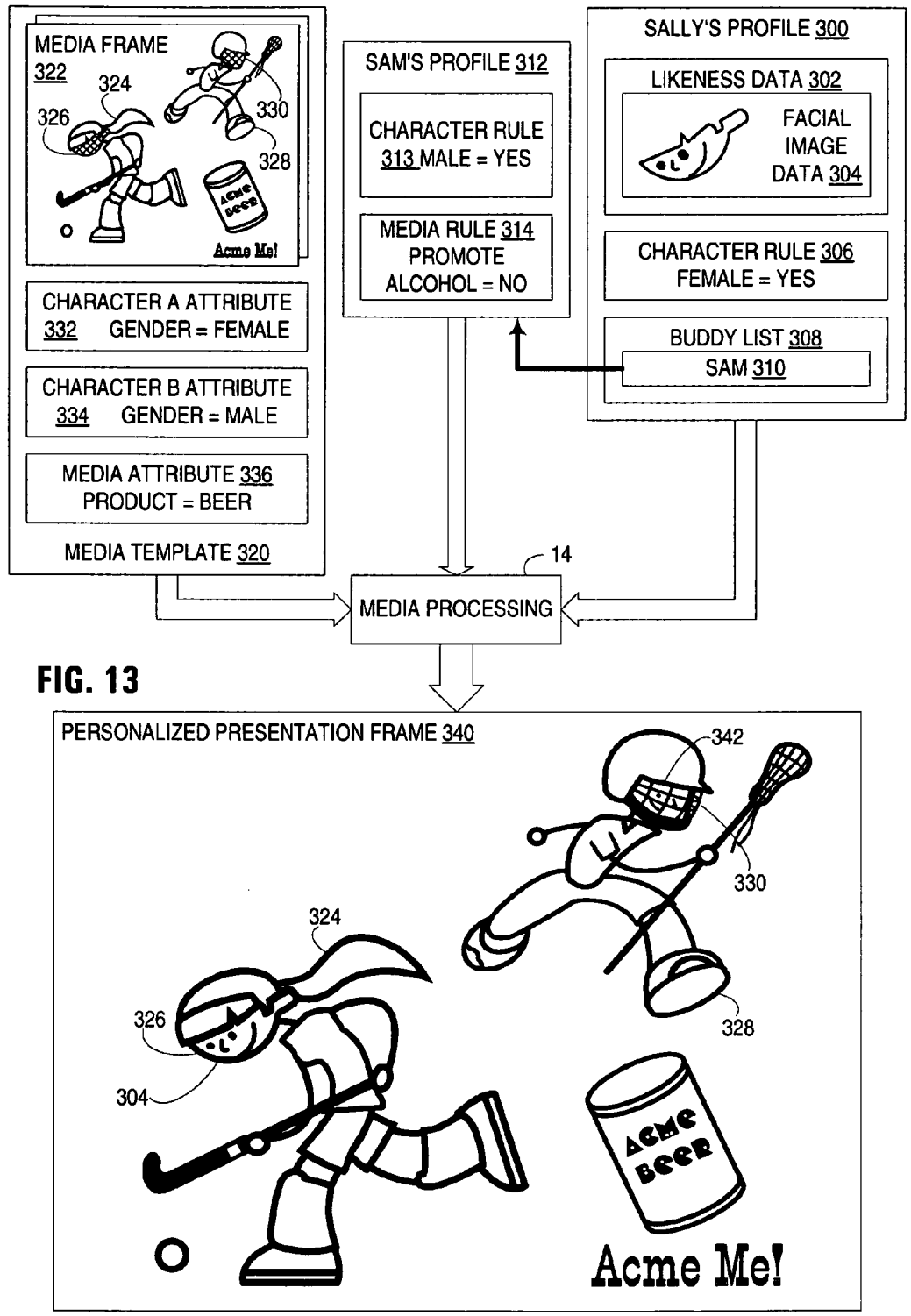
FIG. 13 is a functional block diagram illustrating the generation of an exemplary personalized media presentation using the media generation routine referenced in FIG. 10.

FIG. 13 provides one example of the generation of a personalized digital media presentation using media generation routine 230. In particular, FIG. 13 illustrates an exemplary user profile 300 for a first user, Sally. User profile 300 includes likeness data 302, including facial image data 304 representing Sally's facial likeness. User profile 300 also includes a ruleset that includes, for example, a character-based rule 306 "Female=Yes" that requires that Sally only be assigned to a female character. In addition, user profile 300 includes a buddy list 308 including an entry 310 for a second user, Sam, which links to a user profile 312 for Sam. User profile 312 includes a ruleset with a character-based rule 313 "Male=Yes" that requires that Sam only be assigned to a male character, and a media-based rule 314 "Promote Alcohol=No", which prohibits Sam's likeness from being incorporated into any media presentation that promotes alcohol. It will be appreciated that user profiles 300, 312 typically include additional information that is not illustrated in FIG. 13 in the interests of brevity.

FIG. 13 also illustrates an exemplary media template 320 for a television commercial, which includes a set of media frames, e.g., media frame 322. Media frame 322 depicts a first character (Character A) 324 including a first facial region 326, and a second character (Character B) 328 including a second facial region 330. Character A includes a character attribute 332 that defines the character's gender to be female, while Character B includes a character attribute 334 that defines the character's gender to be male. In addition, a media attribute 336 characterizes the media as having a product "beer" associated therewith.

It will be appreciated that, during character assignment using routine 234 processing of character A in the media template will result in Sally's profile being found to be a match, based upon rule 306 requiring the gender of the character to be female. Routine 234 will also find that, when processing character B, the character-based rule 313 in Sam's profile permits Sam to be incorporated into the media presentation, but the media-based rule 314 prohibits such incorporation. As a result, Sam will not be assigned to a character or incorporated into the media presentation.

FIG. 13 illustrates a personalized presentation frame 340 generated from media frame 322 in media template 320 using generate personalized presentation routine 236. As can be seen, the depiction of character A 324 is modified to incorporate the facial image data 304 from Sally's user profile 300 into the facial region 326, while the depiction of character B 328 incorporates a default facial image 342 in facial region 330.

Additional Functionality

Various additional functions may be supported consistent with the invention. For example, a number of background/distributed processing techniques may be used to facilitate generating personalized media presentations with reduced processing effort.

As one example, personalized media presentations may be distributed by a media processing service or a user profile broker service to other users depicted in such presentations once generated for one user. Thus, if two users have compatible settings and buddies, and will have the same basic presentation generated therefor from the same media template, the presentation may only need to be generated once for one user, then communicated to the other user.

As another example, such presentation reuse may be performed on a single character basis. Thus, for example, if the likeness of a user Zack is used for Character A of a presentation on Zack's machine, this generated portion may be communicated to other networked devices that also use Zack for Character A. In some instances, the portions that may be distributed may have no other characters or interruptions, whereby other devices may simply insert the communicated portions into their respective presentations, thus eliminating the need to perform character replacement for those portions.

Prediction based pre-processing may also be used, e.g., on a clustered or non-active system, or on a computing grid, such that character replacement processing may be performed during periods of inactivity. In addition, if character replacement is controlled so as to limit replacement to online users, pre-processing could be performed for multiple scenarios (i.e. who is connected, what rules will likely be in place) so that the presentation for the proper scenario will be available once needed. As an example, pre-processing in the manner discussed above may be implemented within a preprocess thread 14A executing within a media processing service 14 (FIG. 3).

As one example, FIG. 17 illustrates a preprocessing routine 440 that may be implemented by a broker or media processing service, or alternatively may be implemented in a client device when generating media presentations on behalf of a given user. Routine 440 begins in preprocessing a segment of a media presentation in block 442, typically during periods of inactivity. The preprocessing typically includes performing character assignment, coupled with generating a segment of the media presentation using character replacement with the likeness data from one or more user profiles selected via character assignment. As noted above, preprocessing may be used to generate a segment where a specific character is displayed, such that the segment may be distributed to other users that may wish to incorporate the segment into their media presentations. Preprocessing may also be used to generate alternative scenarios, e.g., to generate alternate segments with different buddies, such that the generation of a media presentation which is based upon an online status of a buddy may be generated by assembling the proper segment. Preprocessing of a segment may also incorporate preprocessing an entire presentation in some embodiments.

After the segment is generated, the segment is cached in block 444, either locally or remotely to a particular user (e.g., in a central database). At a later point in time, the segment may then be distributed as shown in block 446, e.g., in response to a request to retrieve a particular media template associated with the segment, or to generate a personalized media presentation for a particular media template. Once the segment has been distributed, the segment may then be incorporated into a media presentation as shown at block 448. Other uses of preprocessing will be apparent to one of ordinary skill having the benefit of the instant disclosure.

It may also be desirable to support preview functionality. For example, it may be desirable to permit users to display a list of upcoming commercials or media segments to provide users with a lead time for creating additional rules. At this time, a generic version of the commercial may also be displayed to a user, and a user may be presented with how their current ruleset would apply to the commercial.

Parental blocking may also be incorporated into personalized digital media presentation generation such that certain presentations having unsuitable parental ratings are precluded from display to a user. Parental controls may also be used to control access and/or editing of user profiles, e.g., to prevent a child from altering their user profile to allow them to be placed in inappropriate situations.

It may also be desirable to support the ability to generate alternate plots or scripts based upon user profile information. For example, FIG. 14 illustrates an alternate generate personalized representation routine 236' that utilizes the personality profiles of the users assigned to characters in a media template to select from among multiple possible scripts or plots. In this regard, the media template may include media frames associated with alternate segments that may be combined together to create a custom script for a presentation. A user's personality profile may then be used to select segments that represent a character acting in a manner that might be expected for the user. As an example, if a media presentation depicts a character receiving a parking ticket, different segments could be scripted where the character argues with the ticketing officer, cries or laughs it off depending upon the user's personality. Furthermore, the personalities of buddies may also have an impact on the selected segments. User profile information other than personality may also be used to alter the script of a presentation.

Routine 236' begins in block 350 by initiating a FOR loop to process each assigned character in the media template. For each such character, control passes to block 352 to obtain the personality profile data from the user profile for the user mapped to such character. Once the personality profiles for the assigned characters have been obtained, block 350 passes control to block 354 to select a plot (or script) from among a plurality of defined plots in the media template. The selection is based upon the personality profile(s) of the users being depicted in the media presentation, and in this regard, alternate plots/scripts may be defined in a template with one or more personality attributes associated therewith such that an appropriate plot or script may be selected.

Once a plot is selected, control passes to block 356 where a set of media frames corresponding to the selected plot is generated. Media frames may be associated with particular segments, for example, such that alternate segments may be selected based upon the selected plot. The media frames in the selected segments may then be assembled together into a set for character replacement processing.

Once the set of media frames has been selected, control passes to block 358 to initiate a FOR loop to process each media frame in the template. For each such frame, block 360 optionally determines whether a processed frame is already available, and if so, passes control to block 362 to pull the processed frame from the database. Otherwise, block 360 passes control to block 364 to obtain the likeness data for each character in the frame from the respective user profiles of the users assigned to the characters, and then to block 366 to insert the likeness data in the media frame. Upon completion of either of blocks 362 or 366, control returns to block 358 to process additional media frames in the set. Once all media frames are processed, routine 236' is complete.

Alternative Applications

The principles of the invention may be applied to a number of different applications consistent with the invention. For example, media presentations may be generated for other types of commercials or advertisements, e.g., still images, internet ads, digital billboards, cell phones, web sites, movie trailers, instant messages, electronic messages. Furthermore, media presentations may incorporate personalized audio in addition to or in lieu of visual images, e.g., in radio or audio advertisements, whereby playback of a user's voice and/or voice synthesis may be used. Media presentations may also be used in non-commercial environments, such as television programs, movies, animated shorts, radio programs, video games, music videos, internet clips, still images, and other scripted or unscripted media content.

It may even be desirable to utilize the principles of the invention to generate non-electronic content, e.g., to generate personalized advertisements in magazines and newspapers, mail order products, non-electronic billboards, etc. In such instances, an electronic or digital image generated via character replacement may then be printed or otherwise formed on a non-electronic medium. Likeness data may also be incorporated into products or product packaging in situations where it is known that users may be subjected to the products. For example, personalized cereal boxes may be produced with the likenesses of consumers in a certain geographical area, which would encourage consumers to actively look for themselves or people they know on products in their local grocery stores.

As shown in FIG. 15, for example, a generate personalized product method 400 is illustrated, which may be used to generate a manufacturing run of products suitable for distribution to a particular geographical area. Method 400 begins in block 402 by collecting user profiles for users in the geographical area of interest. Next, block 404 creates groups of user profiles based upon the buddy lists in the collected user profiles, thus identifying groups of users that know one another or are otherwise related to one another. Alternatively, block 404 may be omitted, or additional logic may be implemented in block 404 to attempt to identify users having relationships that are not explicitly defined via buddy lists.

Next, block 406 initiates a FOR loop to process each group of user profiles. In particular, for each group of user profiles, block 408 is executed to assign users from the group of user profile to characters from a packaging template, and then to perform character replacement to generate a personalized product graphic based upon the packaging template. The graphic may be electronic in nature, and may be used, for example, to control the printing of an image on product packaging. The result of the FOR loop is therefore to create a set of personalized graphics that may be printed on the product packaging. Block 410 thereafter prints or otherwise applies the personalized graphics to selected numbers of product packaging, such that, for the product run, a certain number of packages will include each personalized graphic. It will be appreciated that other default graphics may be printed in the same product run if desired. Once the products are packaged, they are distributed to one or more retail locations in the geographical area for sale.

Embodiments consistent with the invention may also be utilized to generate revenue, e.g., by providing various fee-based services for which users would be willing to pay (illustrated at 16 in FIG. 1). As one example, user profiles and personalized media presentations may be free for personal use, but fees may be charged for more advanced options such as sharing profiles with other users, using additional users in the same presentation, distributing presentations to other users, recording presentations for later playback, etc.

Fees may also be charged based upon factors such as processing power required (e.g., based upon the complexity of the character replacement), the length of a presentation, the number of replacements in a particular presentation, how detailed/thorough the replacement is, etc.

The principles of the invention may be incorporated into a dating service, whereby clients may be matched in digital segments based on similar interests and profiles. Fees may be charged, for example, for using profiles and matching with other profiles, and/or for obtaining contact information for another user inserted into a presentation. Furthermore, a user may be provided with the ability to reject other individuals such that character replacement will not occur with that individual in the future.

The principles of the invention may be incorporated into an invitation or greeting card service, e.g., to provide personalized invitations or greeting cards that a user could send to other users. For example, a user could use a hot dog commercial with his likeness and/or the likenesses of guests in association with an invitation to a cookout.

Users may also be charged fees for receiving notification of when they are appearing in a presentation, e.g., via email, instant message, etc., and/or of what presentations a user has already appeared in (even in other users' presentations). Furthermore, a user may be allowed to adjust his or her ruleset if he or she is unhappy with the presentations generated with his or her likeness.

It may also be desirable to provide fee-based services to entities other than the users having user profiles managed by a user profile broker service consistent with the invention. As an example, retailers or manufacturers may be provided with access to user profiles in connection with the production of personalized products or the generation of advertisements to consumers. As one example, a retailer may wish to subscribe to a service that provides access to user profiles and/or the generation of personalized advertisements to customers. When combined with presence awareness (e.g., via biometric identification, customer identification during payment or checkout, or other mechanisms), a retailer could generate personalized advertisements for display in a store while the user is present in the store.

FIG. 16, for example, illustrates a generate personalized store advertisements routine 420 that may be used to generate custom advertisements at a retail location, e.g., in the form of video or still image electronic advertisements. Routine 420 begins in block 422 by updating a list of consumers that are detected as being present in a retail location, using any of various presence detection technologies known in the art. Block 424 then retrieves user profiles for one or more consumers from the list, and block 426 assigns the selected consumers to characters in an advertisement template. Block 428 then generates the personalized advertisement by performing character replacement on the template, and bock 430 displays the personalized advertisement at the retail location, with the expectation that one of the consumers replaced in the advertisement will view the advertisement while at the retail location. In this embodiment, advertisements are generated continuously, and as a result, upon completion of block 430, control returns to block 422 to generate additional advertisements. It will be appreciated that multiple advertisement templates may be used and cycled through to minimize repetitiveness.

Other modifications will be apparent to one of ordinary skill in the art. Therefore, the invention lies in the claims hereinafter appended.

What is claimed is:

1. A method of controlling the incorporation of likeness data for an individual into a media presentation, the method comprising:
   maintaining a broker service that manages and distributes a plurality of rulesets respectively associated with a plurality of individuals, wherein each of the plurality of rulesets restricts incorporation of likeness data associated with the associated individual into media presentations, and wherein each of the plurality of rulesets includes at least one rule configured to define a condition under which the likeness data for the associated individual may or may not be incorporated into a media presentation; and
   receiving a request for the ruleset for a selected individual with the broker service and in response thereto using the broker service to initiate communication of the ruleset to a requesting entity.

2. The method of claim 1, wherein the requesting entity is associated with the selected individual, and wherein the request is made in association with generating a personalized media presentation for the selected individual.

3. The method of claim 1, wherein the requesting entity is associated with an individual other than the selected individual, and wherein the request is made in association with generating a personalized media presentation for the other individual.

4. The method of claim 1, wherein each ruleset is maintained in a user profile for the associated individual.

5. The method of claim 4, wherein at least one user profile includes a buddy list that links to the user profile of another individual.

6. The method of claim 4, wherein the user profile for each individual further includes the likeness data for the associated individual.

7. The method of claim 6, wherein the likeness data in each user profile includes at least one of pictorial data, a body attribute, a personality profile, a descriptive attribute, possession likeness data or voice data.

8. The method of claim 4, wherein at least one user profile includes a rule that is inherited from another user profile.

9. The method of claim 4, wherein at least one ruleset includes a rule including at least one of a character preference, a media preference, or a relationship preference.

10. The method of claim 4, further comprising creating a user profile in response to user input.

11. The method of claim 10, wherein creating the user profile includes receiving user input to select one of a plurality of default rule groups.

12. The method of claim 4, further comprising making at least one user profile accessible to members of a group.

13. The method of claim 4, further comprising maintaining a plurality of media templates, each media template including at least one attribute characterizing the media template, wherein at least one ruleset includes a rule that tests the attribute of at least one media template.

14. The method of claim 1, further comprising preprocessing at least a portion of a media presentation using a media template and at least one ruleset.

15. The method of claim 14, wherein preprocessing the portion of the media presentation includes performing character replacement on a segment of a media presentation with an individual's likeness data using the individual's ruleset, the method further comprising distributing the segment for incorporation into a second media presentation.

16. The method of claim 1, further comprising distributing a media presentation generated on behalf of a first individual for display to a second individual.

17. An apparatus, comprising:
   at least one processor; and
   program code configured to be executed by the at least one processor to control the incorporation of likeness data for an individual into a media presentation by maintaining a broker service that manages and distributes a plurality of rulesets respectively associated with a plurality of individuals, wherein each of the plurality of rulesets restricts incorporation of likeness data associated with the associated individual into media presentations, and wherein each of the plurality of rulesets includes at least one rule configured to define a condition under which the likeness data for the associated individual may or may not be incorporated into a media presentation; and receiving a request for the ruleset for a selected individual with the broker service and in response thereto using the broker service to initiate communication of the ruleset to a requesting entity.

18. A program product, stored in a memory device, comprising: program code configured to control the incorporation of likeness data for an individual into a media presentation by maintaining a broker service that manages and distributes a plurality of rulesets respectively associated with a plurality of individuals, wherein each of the plurality of rulesets restricts incorporation of likeness data associated with the associated individual into media presentations, and wherein each of the plurality of rulesets includes at least one rule configured to define a condition under which the likeness data for the associated individual may or may not be incorporated into a media presentation; and receiving a request for the ruleset for a selected individual with the broker service and in response thereto using the broker service to initiate communication of the ruleset to a requesting entity.

19. A system, comprising at least one processor, for providing a computer-implemented broker service accessible over a computer network, the service configured to control the incorporation of likeness data for an individual into a media presentation by managing and distributing a plurality of rulesets respectively associated with a plurality of individuals, wherein each of the plurality of rulesets restricts incorporation of likeness data associated with the associated individual into media presentations, and wherein each of the plurality of rulesets includes at least one rule configured to define a condition under which the likeness data for the associated individual may or may not be incorporated into a media presentation; and responding to receiving a request for the ruleset for a selected individual and in response thereto initiating communication of by communicating the ruleset to a requesting entity.

20. The system, comprising at least one processor, for providing the computer-implemented service of claim 19, wherein the service is a grid service.

21. The system, comprising at least one processor, for providing the computer-implemented service of claim 19, wherein the service is a peer-to-peer service.

22. The system, comprising at least one processor, for providing the computer-implemented service of claim 19, wherein at least a portion of the service is provided by a server in a client-server system.

* * * * *